United States Patent [19]

Muhle et al.

[11] Patent Number: 5,763,543
[45] Date of Patent: Jun. 9, 1998

[54] OLEFIN POLYMERIZATION PROCESS WITH LITTLE OR NO SCAVENGER PRESENT

[75] Inventors: Michael Elroy Muhle, Kingwood; Gary Thomas Renola, Seabrook; Agapios Kyriacos Agapiou, Humble; Dwayne Lee Litteer; John Robert Griffin, both of Baytown, all of Tex.

[73] Assignee: Exxon Chemical Patents Inc., Houston, Tex.

[21] Appl. No.: 306,055

[22] Filed: Sep. 14, 1994

[51] Int. Cl.⁶ .................................................. C08F 2/34
[52] U.S. Cl. ............................ 526/68; 526/88; 526/901
[58] Field of Search ............................... 526/68, 88, 901

[56] References Cited

U.S. PATENT DOCUMENTS

| | | | |
|---|---|---|---|
| 4,543,399 | 9/1985 | Jenkins, III et al. | 526/70 |
| 4,588,790 | 5/1986 | Jenkins, III et al. | 526/70 |
| 4,871,705 | 10/1989 | Hoel | 502/117 |
| 5,017,665 | 5/1991 | Chang | 526/129 |
| 5,028,670 | 7/1991 | Chinh et al. | 526/73 |
| 5,229,478 | 7/1993 | Floyd et al. | 526/160 |
| 5,241,031 | 8/1993 | Mehta | 526/348.1 |
| 5,281,679 | 1/1994 | Jejelowo et al. | 526/114 |
| 5,332,706 | 7/1994 | Nowlin et al. | 526/116 |
| 5,359,015 | 10/1994 | Jejelowo | 526/114 |

FOREIGN PATENT DOCUMENTS

| | | |
|---|---|---|
| 0526955A1 | 2/1993 | European Pat. Off. . |
| 0604994A1 | 7/1994 | European Pat. Off. . |
| 0605002A1 | 7/1994 | European Pat. Off. . |
| 61-108610 | 5/1986 | Japan . |
| 93/04486 | 3/1993 | WIPO . |
| 93/09148 | 5/1993 | WIPO . |
| 94/03509 | 2/1994 | WIPO . |
| 94/14855 | 7/1994 | WIPO . |
| 94/14856 | 7/1994 | WIPO . |
| 94/25497 | 11/1994 | WIPO . |

*Primary Examiner*—Thomas R. Weber
*Attorney, Agent, or Firm*—Jaimes Sher; Denise Y. Wolfs

[57] ABSTRACT

The present invention relates to a continuous process for the polymerization of olefin(s) utilizing a metallocene catalyst or catalyst system in a continuous slurry or gas phase polymerization process for polymerizing monomer(s). The invention is more particularly drawn to a gas phase polymerization process for polymerizing one or more olefin(s), alone or in combination, in the presence of a metallocene catalyst system in a fluidized bed reactor, preferably operating in a condensed mode.

38 Claims, No Drawings

OLEFIN POLYMERIZATION PROCESS WITH LITTLE OR NO SCAVENGER PRESENT

FIELD OF THE INVENTION

The present invention relates to a continuous process for the polymerization of olefin(s) utilizing as the catalyst a bulky ligand transition metal compound. More particularly, the invention is directed to a continuous slurry or gas phase polymerization process for polymerizing monomer(s). The invention is more particularly drawn to a gas phase polymerization process for polymerizing one or more olefin(s), alone or in combination, in the presence of a metallocene catalyst system in a fluidized bed reactor.

BACKGROUND OF THE INVENTION

It is widely known that gas and slurry phase polymerization processes utilizing bulky ligand transition metal catalysts, otherwise known as metallocene catalysts, have been used to produce a diverse array of new polymers for use in a wide variety of applications and products. It is well known in the art that these metallocene catalysts and catalyst systems are quite soluble in many liquids, particularly those diluents or reactive components used in a typical polymerization process. In addition, metallocene catalysts can also be affected chemically and physically by various components typically used in a commercial polymerization process. Metallocene catalyst components and catalyst system components have a tendency toward fouling and/or sheeting in a slurry or gas phase polymerization process. In a continuous slurry process, in particular, fouling on the walls of the reactor, which acts as heat transfer surface and can result in many problems including poor heat transfer in the polymerization process. Polymer particles that adhere to the walls of the reactor continue to polymerize and often fuse together and form chunks, which can be detrimental to a continuous process, particularly a fluidized bed process.

In a continuous gas phase process, a continuous recycle stream is employed. The recycle stream is heated by the heat of polymerization, and in another part of the cycle, heat is removed by a cooling system external to the reactor.

Fouling in a continuous gas phase process can lead to the ineffective operation of various reactor systems, for example the cooling system, temperature probes and the distributor plate, which are often employed in a gas phase fluidized bed polymerization process.

As a result of the reactor operability issues associated with using metallocene catalysts and catalyst systems various techniques for supporting or producing a metallocene catalyst system with reduced tendencies for fouling have been developed. For example, U.S. Pat. No. 5,283,218 is directed towards the prepolymerization of a metallocene catalyst. U.S. Pat. No. 5,332,706 has resorted to a particular technique for forming a catalyst by "incipient impregnation".

While all these possible solutions might reduce fouling or sheeting somewhat, some are expensive to employ and/or may not reduce both fouling and sheeting to a level sufficient for the successful operation of a continuous process, particularly a commercial or large-scale process.

Thus, it would be highly advantageous to have a polymerization process capable of operating continuously with enhanced reactor operability while at the same time producing polymers having improved physical properties.

SUMMARY OF THE INVENTION

This invention relates to a continuous, slurry or gas phase, polymerization process for polymerizing one or more olefin(s) utilizing a bulky ligand transition metal catalyst, for example a metallocene catalyst or catalyst system.

In one embodiment, the invention provides for a continuous process for polymerizing one or more olefin(s), alone or in combination, in the presence of a metallocene catalyst system where the process involves the elimination or the reduction of a scavenging component.

In a preferred embodiment the above process of the invention is a slurry, preferably a gas phase polymerization processes.

In another preferred embodiment the process of the invention is a gas phase polymerization processes operating in a condensed mode.

DETAILED DESCRIPTION OF THE INVENTION

Introduction

The invention is directed toward a continuous polymerization process having improved operability and capable of producing improved polymer products utilizing a bulky ligand transition metal metallocene catalyst component. It has been discovered that the use of a scavenging component typically utilized as an additive, in particular in a slurry and especially in a gas phase polymerization process, to remove reactor impurities increases fouling and sheeting, which can lead to a reactor shut-down. The scavenging component can also increase the production of fines.

Typically these scavenging components serve a dual function. They not only remove impurities but also serve as an activator or cocatalyst for particularly those traditional Ziegler-Natta catalysts, for example titanium and vanadium halides. Also, use of a scavenging component can result in a poorer polymer product containing gels.

Further, too much scavenger can result in a decrease in catalyst activity and result in olefinic low molecular weight oligomers.

Thus, elimination or reduction of an otherwise well known and widely used component, a scavenger, provides for the process of this invention having improved reactor operability, improved catalyst activity and a substantially gel free polymer product.

Catalyst Components and Catalyst Systems of the Invention

Metallocene catalysts, for example, are typically those bulky ligand transition metal compounds derivable from the formula:

$[L_mM]A_n$ where L is a bulky ligand; A is leaving group, M is a transition metal and m and n are such that the total ligand valency corresponds to the transition metal valency. Preferably the catalyst is four co-ordinate such that the compound is ionizable to a $1^+$ charge state.

The ligands L and A may be bridged to each other, and if two ligands L and/or A are present, they may be bridged. The metallocene compound may be full-sandwich compounds having two or more ligands L, which may be cyclopentadienyl ligands or cyclopentadiene derived ligands, or half-sandwich compounds having one ligand L, which is a cyclopentadienyl ligand or derived ligand.

In one embodiment, at least one ligand L has a multiplicity of bonded atoms, preferably carbon atoms, that typically is a cyclic structure such as, for example, a cyclopentadienyl ligand, substituted or unsubstituted, or cyclopentadienyl derived ligand or any other ligand capable of η-5 bonding to the transition metal atom. One or more bulky ligands may be π-bonded to the transition metal atom. The transition metal atom may be a Group 4, 5 or 6 transition metal and/or a metal from the lanthanide and actinide series. Other ligands may be bonded to the transition metal, such as a leaving group, such as but not limited to hydrocarbyl, hydrogen or any other univalent anionic ligand. Non-limiting examples of metallocene catalysts and catalyst systems are discussed in for example, U.S. Pat. Nos. 4,530,914, 4,952,716, 5,124, 418, 4,808,561, 4,897,455, 5,278,264, 5,278,119, 5,304,614 all of which are herein fully incorporated by reference. Also, the disclosures of EP-A-0 129 368, EP-A-0 591 756, EP-A-0 520 732, EP-A-0 420 436, WO 91/04257 WO 92/00333, WO 93/08221, and WO 93/08199 are all fully incorporated herein by reference.

Various forms of the catalyst system of the metallocene type may be used in the polymerization process of this invention. Exemplary of the development of metallocene catalysts in the art for the polymerization of ethylene is the disclosure of U.S. Pat. Nos. 4,871,705, 4,937,299 and 5,324, 800, 5,017,714 and 5,120,867 all of which are fully incorporated herein by reference. These publications teach the structure of the metallocene catalysts and include alumoxane as the cocatalyst. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, all of which incorporated herein by reference.

Further, the metallocene catalyst component of the invention can be a monocyclopentadienyl heteroatom containing compound. This heteroatom is activated by either an alumoxane, an ionizing activator, a Lewis acid or a combination thereof to form an active polymerization catalyst system. These types of catalyst systems are described in, for example, PCT International Publication WO 92/00333, WO 94/07928, and WO 91/ 04257, WO 94/03506, U.S. Pat. Nos. 5,057,475, 5,096,867, 5,055,438, 5,198,401, 5,227,440 and 5,264,405 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. Nos. 5,064,802, 5,149,819, 5,243,001, 5,239,022, 5,276,208, 5,296,434, 5,321,106, 5,329,031 and 5,304,614, PCT publications WO 93/08221 and WO 93/08199 and EP-A-0 578 838 all of which are herein incorporated by reference.

The preferred transition metal component of the catalyst of the invention are those of Group 4, particularly, zirconium, titanium and hafnium. The transition metal may be in any oxidation state, preferably +3 or +4 or a mixture thereof For the purposes of this patent specification the term "metallocene" is defined to contain one or more unsubstituted or substituted cyclopentadienyl or cyclopentadienyl moiety in combination with a transition metal. In one embodiment the metallocene catalyst component is represented by the general formula $(C_p)_mMR_nR'_p$ wherein at least one $C_p$ is an unsubstituted or, preferably, a substituted cyclopentadienyl ring, symmetrical or symetrically substituted; M is a Group 4, 5 or 6 transition metal; R and R' are independently selected halogen, hydrocarbyl group, or hydrocarboxyl groups having 1–20 carbon atoms or combinations thereof, m=1–3, n=0–3, p=0–3, and the sum of m+n+p equals the oxidation state of M, preferably m=2, n=1 and p=1.

In another embodiment the metallocene catalyst component is represented by the formulas:

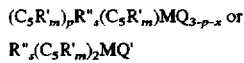

$$R''_s(C_5R'_m)_2MQ'$$

wherein M is a Group 4, 5, 6 transition metal, at least one $C_5R'_m$ is a substituted cyclopentadienyl, each R', which can be the same or different is hydrogen, alkyl, alkenyl, aryl, alkylaryl or arylalkyl radical having from 1 to 20 carbon atoms or two carbon atoms joined together to form a part of a substituted or unsubstituted ring or rings having 4 to 20 carbon atoms, R" is one or more of or a combination of a carbon, a germanium, a silicon, a phosphorous or a nitrogen atom containing radical bridging two $(C_5R'_m)$ rings, or bridging one $(C_5R'_m)$ ring to M, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides. Q' is an alkylidene radical having from 1–20 carbon atoms, s is 0 or 1 and when s is 0, m is 5 and p is 0, 1 or 2 and when s is 1, m is 4 and p is 1.

For the purposes of this patent specification, the terms "cocatalysts" and "activators" are used interchangeably and are defined to be any compound or component which can activate a bulky ligand transition metal compound or a metallocene, as defined above. It is within the scope of this invention to use alumoxane as an activator, and/or to also use ionizing activators, neutral or ionic, or compounds such as tri (n-butyl) ammonium tetra bis(pentaflurophenyl) boron or trisperfluoro phenyl boron metalloid precursor, which ionize the neutral metallocene compound. Such ionizing compounds may contain an active proton, or some other cation associated with but not coordinated or only loosely coordinated to the remaining ion of the ionizing compound. Such compounds and the like are described in EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197 and 5,241,025 and U.S. patent application Ser. No. 08/285, 380, filed Aug. 3, 1994, now abandoned, are all herein fully incorporated by reference. Combinations of activators are also contemplated by the invention, for example, alumoxane and ionizing activators in combinations, see for example, WO 94/07928.

In another embodiment of the invention two or more metallocene catalyst components can be combined in the catalyst system of the invention. For example, those mixed catalysts described in U.S. Pat. No. 5,281,679 and U.S application Ser. No. 138,818 filed Oct. 14, 1993, now U.S. Pat. No. 5,466,649, both of which are incorporated herein by reference. Also, in another embodiment of the invention at least one metallocene catalyst can be combined with a non-metallocene or traditional Ziegler-Natta catalyst or catalyst system, non-limiting examples are described in U.S. Pat. Nos. 4,701,432, 5,124,418, 5,077,255 and 5,183,867 all of which are incorporated herein by reference.

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene or polystyrene divinyl benzene polyolefins or polymeric compounds or any other organic support material and the like, or mixtures thereof.

The preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention has a surface area in the range of from about 10 to about 700 $m^2/g$, pore volume in the range of from about 0.1 to about 4.0 cc/g and average particle size in the range of from about 10 to about 500 µm. More preferably, the surface area is in the range of from about 50 to about 500 $m^2/g$, pore volume of from about 0.5 to about 3.5 cc/g and average particle size of from about 20 to about 200 µm. Most preferably the surface area range is from about 100 to about 400 $m^2/g$, pore volume from about 0.8 to about 3.0 cc/g and average particle size is from about 10 to about 100 µm. the pore size of the carrier of the invention typically has pore size in the range of from 10° to 1000° A, preferably 50° to about 500° A, and most preferably 75° to about 350° A.

The catalyst system of the invention can be made in a variety of different ways as previously described. In one embodiment the catalyst is unsupported, see U.S. Pat. No. 5,317,036 and EP-A-0 593 083 incorporated herein by reference. In the preferred embodiment, the catalyst system of the invention is supported. Examples of supporting the catalyst system used in the invention are described in U.S. Pat. Nos. 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706 and U.S. patent application Ser. No. 138,818, filed Oct. 14, 1993, now U.S. Pat. No. 5,466,649, U.S. Ser. No. 170,108, filed Dec. 20, 1993, now abandoned, U.S. Ser. No. 182,244, filed Jan. 14, 1994, now abandoned, U.S. Ser. No. 233,668, filed Apr. 26, 1994, now abandoned, U.S. Ser. No. 265,533, filed Jun. 24, 1994, now abandoned, filed Jun. 24, 1994, now abandoned, U.S. Ser. No. 271,598, filed Jul. 7, 1994, now U.S. Pat. No. 6,468,702, U.S. Ser. No. 287,327, filed Aug. 18, 1994, now U.S. Pat. No. 5,489,024. In one embodiment of the process of the invention, olefin(s), preferably $C_2$ to $C_{20}$ alpha-olefins, preferably ethylene or propylene or combinations thereof are prepolymerized in the presence of the catalyst or catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833, 5,283,278 and 4,921,825 and EP-B-0279 863 all of which are herein fully incorporated by reference.

In another embodiment of the invention, the supported catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention, however, it is preferred that it is added after the supported catalyst system of the invention is formed, in either a slurry or dried state.

In another embodiment of the invention, the supported catalyst system of the invention includes a polyolefin wax or tackifier or the like.

The preferred method for producing the catalyst of the invention is described below and can be found in U.S. application Ser. Nos. 265,533, filed Jun. 24, 1994, now abandoned, U.S. Ser. No. 265,532, filed Jun. 24, 1994,now abandoned, both are herein fully incorporated by reference in their entirety. In a preferred embodiment, the metallocene catalyst component is typically slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are preferably mixed together and added to a porous support such that the total volume of the metallocene solution and the activator solution or the metallocene and activator solution is less than four times the pore volume of the porous support, more preferably less than three times, even more preferably less than two times, and most preferably in the 1.5 times to 2.5 times range. Also, in the preferred embodiment, an antistatic agent is added to the catalyst preparation.

In one preferred embodiment a substantially homogenous catalyst system is preferred. For the purposes of this patent specification and appended claims, a "substantially homogenous catalyst" is one in which the mole ratio of the transition metal of the catalyst component, preferably with an activator, is evenly distributed throughout a porous support.

The procedure for measuring the total pore volume of a porous support is well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration*, Vol. 28, No. 3, Analytical Chemistry 332–334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3:1.

Polymerization Process of the Invention

The catalysts and catalyst systems of this invention are suited for the polymerization of monomers and optionally comonomers in any polymerization process, gas or slurry, most preferably a gas phase process is used.

In the preferred embodiment, this invention is directed toward the slurry or gas phase polymerization or copolymerization reactions involving the polymerization of one or more of the alpha-olefin monomers having from 2 to 20 carbon atoms, preferably 2–12 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1, and cyclic olefins such as cyclopentene, and styrene or a combination thereof. Other monomers can include polar vinyl, diolefins such as dienes, polyenes, norbornene, norbornadiene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms. In another embodiment ethylene or propylene is polymerized with at least two different comonomers to form a terpolymer and the like, the preferred comonomers are a combination of alpha-olefin monomers having 3 to 10 carbon atoms, more preferably 4 to 8 carbon atoms.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670 and U.S. patent application Ser. No. 053,067, filed Apr. 26, 1993, now U.S. Pat. No. 5,352,749, and U.S. application Ser. No. 216,520, filed Mar. 22, 1994, now U.S. Pat. No. 5,405,922, all of which are fully incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

A slurry polymerization process generally uses pressures in the range of about 1 to about 50 atmospheres and even greater and temperatures in the range of 0° C. to about 200° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene or xylene. The medium employed should be liquid under the conditions of polymerization and relatively inert. Preferably, hexane or isobutane is employed. Non-limiting examples of slurry processes include loop or stirred tank processes.

In one embodiment the reactor utilized in the present invention is capable of producing greater than 500 lbs/hr (227 Kg/hr) to about 200,000 lbs/hr (90,900 Kg/hr)or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

For the purposes of this patent specification and appended claims a "scavenger" is any organometallic compound which is reactive towards oxygen and/or water and/or polar compounds and which does not include the catalyst components, for example, the metallocene catalyst component, the activator, the optional carrier or the components remaining in or on the catalyst used in its preparation, for example toluene including any organometallic compounds used in the catalyst preparation. Non-limiting examples of scavenger compounds are those represented by the general formula $R_nM$, where M is a Group 12 or 13 element, each R, which can be the same or different, is a substituted or unsubstituted, straight or branched chain alkyl radical, cyclic hydrocarbyl, alkyl-cyclohydrocarbyl radical, aromatic radical or alkoxide radical, wherein n is 2 or 3.

In another embodiment, the scavenger is a hydrocarbon aluminum compound of the formula $AlR_{(3-a)}X_a$ where R is alkyl, cycloalkyl, aryl or a hydride radical. Each alkyl radical can be straight or branched chain having from 1 to 20 carbon atoms, preferably 1 to 10 carbon atoms. X is a halogen or hydride for example chlorine, bromine or iodine, chlorine is preferred; a is 0, 1 or 2.

Illustrative, but non-limiting examples of such compounds of the above formula can include when M is aluminum (Al) the trialkyl aluminums such as trimethyl aluminum, triethyl aluminum, tri-n-propyl aluminum, tri-isopropyl aluminum, tri-n-butyl aluminum, tri-sec-butyl aluminum, tri-t-butyl aluminum, tri-isobutyl, aluminum, tri-n-pentyl aluminum, tricyclopentyl aluminum, tri-n-hexyl aluminum, tri-(4-methylpentyl) aluminum, tri-(3-methylpentyl) aluminum, tricyclohexyl aluminum, and the like; alkyl aluminums such as dimethylethyl aluminum, methyldiethyl aluminum, ethyldimethyl aluminum, dimethyl-n-propyl aluminum, methyl di-n-propyl aluminum, dimethylisopropyl aluminum, dimethylcyclohexyl aluminum, methylethylpropyl aluminum, and the like, aryl and alkyl-substituted aluminums, such as triphenyl aluminum, tri-p-tolyl aluminum, tri-m-tolyl aluminum, tri-p-ethyl aluminum, and the like. Other non-limiting examples of typical scavengers include dialkyl aluminum halides, for instance diethylaluminum chlorides, ethyl aluminum dichlorides, bromides and iodides and dialkyl aluminum sesquichlorides, bromides and iodides; aluminum alkoxides and aryloxides such as dimethyl aluminum methoxide, dimethyl aluminum ethoxide, diethyl aluminum ethoxide, diethyl aluminum isopropoxide, methyl ethyl aluminum methoxide, dimethyl aluminum 4-methylphenoxide, demethyl aluminum 3-methylphenoxide, dimethyl aluminum 2,6-diisopropylphenoxide, dimethyl aluminum 2,6-di-t-butyl4-methylphenoxide, and the like.

A similar list of illustrative Group 13 element compounds where M is boron could be made for the trialkyl boranes, alkyl boranes, and alkyl borane alkoxides. Also a similar list could be given for the analogous compounds of gallium and indium. Such list would be nearly identical to that already presented with respect to the aluminum species and therefore such listing of the borane analogues and other Group 13 elements analogues are not necessary to a complete disclosure.

Scavengers typically preferred are those in the above formula wherein M is aluminum or boron. Of the aluminum species of Group 13 element compounds, the most often used as scavengers are trialkylaluminums, and of the trialkylaluminums the most preferred are triethylaluminum, triisobutyl aluminum and trimethylaluminum.

Other specific scavengers include such organometallic compounds for example, $BX_3$ where X is a halogen, $R_1R_2Mg$, ethyl magnesium, $R_4CORMg$, RCNR, $ZnR_2$, $CdR_2$, LiR, $SnR_4$ where R are hydrocarbon groups that could be the same or different.

Other organometallic compounds useful as scavengers include those compounds of Group 1, 2, 3 and 4 organometallic alkyls, alkoxides, and halides. The preferred organometallic compounds are lithium alkyls, magnesium or zinc alkyls, magnesium alkyl halides, aluminum alkyls, silicon alkyl, silicon alkoxides and silicon alkyl halides. The more preferred organometallic compounds useful as scavengers are aluminum alkyls and magnesium alkyls. The most preferred organometallic compounds useful as scavengers are aluminum alkyls, for example, triethylaluminum (TEAL), trimethylaluminum (TMAL), triisobutylaluminum (TIBAL) and tri-n-hexylaluminum (TNHAL) and diethyl aluminum chloride (DEAC) and the like. TEAL being the most widely used scavenger.

In one embodiment of the process of the invention the process is essentially free of a scavenger. For the purposes of this patent specification and appended claims the term "essentially free" means that during the process of the invention no more than 10 ppm of a scavenger based on the total weight of the recycle stream is present at any given point in time during the process of the invention.

In another embodiment of the process of the invention the process is substantially free of a scavenger. For the purposes of this patent specification and appended claims the term "substantially free" is defined to be that during the process of the invention no more than 50 ppm of a scavenger based on the total weight of a fluidized bed is present at any given point in time during the process of the invention.

In one embodiment during reactor start-up to remove impurities and ensure polymerization is initiated, a scavenger is present in an amount less than 300 ppm, preferably less than 250 ppm, more preferably less than 200 ppm, even more preferably less than 150ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

In another embodiment of the process of the invention the scavenger is present in an amount sufficient until the catalyst of the invention has achieved a catalyst productivity on a weight ratio basis of greater than 1000 grams of polymer per gram of the catalyst, preferably greater than about 1500, more preferably greater than 2000, even more preferably greater than 2500, and most preferably greater than 3000.

In another embodiment of the process of the invention during start-up the scavenger is present in an amount sufficient until the catalyst of the invention has achieved a catalyst productivity 40 percent of that of steady-state, preferably less than 30 percent, even more preferably less than 20 percent and most preferably less than 10 percent. For the purposes of this patent specification and appended claims "steady state" is the production rate, weight of polymer being produced per hour.

The productivity of the catalyst or catalyst system is influenced by the main monomer, (i.e. ethylene or propylene) partial pressure. The preferred mole percent of the monomer, ethylene or propylene, is from about 25 to 90 mole percent and the monomer partial pressure is in the range of from about 75 psia (517 kPa) to about 300 psia (2069 kPa), which are typical conditions in a gas phase polymerization process.

When a scavenger is utilized in the process of the invention the scavenger can be introduced typically into the reactor directly or indirectly into the recycle stream or into any external means capable of introducing the scavenger into the reactor. Preferably the scavenger enters into the reactor directly, and most preferably directly into the reactor bed or below the distributor plate in a typical gas phase process, preferably after the bed is in a fluidized state.

The scavenger used in the process of the invention is introduced to the reactor at a rate equivalent to 10 ppm to 100 ppm based on the steady state, production rate, and then scavenger introduction is stopped.

In yet another embodiment particularly during start-up the scavenger when used is introduced at a rate sufficient to provide an increase in catalyst productivity on a weight ratio basis of a rate of 200 grams of polymer per gram of catalyst per minute, preferably at a rate of 300, even more preferably at a rate of 400 and most preferably at a rate of 500.

In another embodiment, the mole ratio of the metal of the scavenger to the transition metal of the metallocene catalyst component equals about, about 0.2 multiplied by the ppm of a scavenger based on the production rate multiplied by the catalyst productivity in kilograms of polymer per gram of catalyst. The range of the mole ratio is from about 300 to 10. In a preferred embodiment, where an alkyl aluminum is used as the scavenger the mole ratio is represented as aluminum (Al) to transition metal, for example, zirconium, where the moles of Al are based on the total amount of scavenger used.

It is also preferred that hydrogen not be added to the system simultaneously with the scavenger.

Fouling can also be influenced by the presence of volatile low molecular weight oligomers. These oligomers are generally even numbered carbon molecules having a molecular weight less than 1000 making up about less than or equal to 1 weight percent of the polymer. Oligomers can be measured by ordinary techniques in the art using a short path thermal desorption unit Model TD-2 from Scientific Instrument Services, Ringoes, N.J. with a Hewlett-Packard 5890 GC and a Hewlett Packard 5970 mass selective detector.

In another embodiment, the scavenger is introduced in a sufficient amount such that the total unsaturated $C_{30}$ or less, preferably $C_{14}$ to $C_{18}$ oligomers are less than 50 ppm in the polymer product, preferably less than 30 ppm, even more preferably less than 20 ppm, and most preferably less than 10 ppm.

Fines for the purpose of this patent specification and appended claims are polymer particles less than 125μ in size. Fines of this size can be measured by using a standard 120 mesh unit sieve screen. In a preferred embodiment the amount of scavenger present in the reactor at any given point in time during the process of the invention the level of fines less than 125μ is less than 1%, preferably less than 0.85% to less than 0.05%.

It is within the scope of the invention that a system external to the reactor for removing scavengers introduced in the process of the invention from the recycle stream may be used. This would then prevent the recycle of the scavenger back into the reactor and prevent scavenger build-up in the reactor system. It is preferred that such a system is placed prior to the heat exchanger or compressor in the recycle stream line. It is contemplated that such a system would condense the scavenger out of the fluidizing medium in the recycle stream line. It would be preferred that the fluidizing medium is treated to remove the scavenger, see for example U.S. Pat. No. 4,460,755, incorporated herein by reference.

It is also contemplated by the process of the invention that scavenger can be intermittently introduced during the process wherein greater than 90%, preferably greater than 95% of all the scavenger introduced is removed from the recycle stream.

It is also contemplated by this invention that the catalyst or catalyst system or components thereof of the invention can be used upon start-up as a scavenger, however, this would be an expensive procedure.

In the most preferred embodiment of the invention the process is a gas phase polymerization process operating in a condensed mode. For the purposes of this patent specification and appended claims the process of purposefully introducing a recycle stream having a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

In another embodiment of the process of the invention the amount of scavenger utilized if any is used should be in a mole ratio less than 100, preferably less than 50, more preferably less than about 25 based on the mole ratio of the metal of the transition metal scavenger to the transition metal of the metallocene where the scavenger is an aluminum containing organometallic compound and the transition metal of the metallocene is a Group 4 metal then the mole ratio above is based on the moles of aluminum to the moles of the Group 4 metal of the catalyst.

Fouling is a term used to describe the collection of polymer deposits on surfaces in a reactor. Fouling is detrimental to all parts of a polymerization process, including the reactor and its associated systems, hardware, etc. Fouling is especially disruptive in areas restricting gas flow or liquid flow. The two major areas of primary concern are the heat exchanger and distributor plate fouling. The heat exchanger consists of a series of small diameter tubes arranged in a tube bundle. The distributor plate is a solid plate containing numerous small diameter orifices through which the gas contained in a recycle stream is passed through before entering the reaction zone or distributed into a bed of solid polymer in a fluidized bed reactor such as described in U.S Pat. No. 4,933,149, incorporated herein by reference.

Fouling manifests itself as an increase in the pressure drop across either the plate, cooler, or both. Once the pressure drop becomes too high, gas or liquid can no longer be circulated efficiently by the compressor, and it is often necessary to shut the reactor down. Cleaning out the reactor can take several days and is very time consuming and costly. Fouling can also occur in the recycle gas piping and compressor, but usually accompanies plate and cooler fouling.

To quantify the rate of fouling it is useful to define a fouling factor, F. F is the fraction of the area of a hole that is fouled. If F=0 (0%) then there is no fouling. Conversely, if F=1 (100%) the hole is completely plugged. It is possible to relate the fouling to the pressure drop, $\Delta P$, at a given time in terms of the pressure drop of a clean system, $\Delta P_0$. As fouling increases $\Delta$ increases and is larger than the initial pressure drop, $\Delta P_0$, F is given by the following expressions:

$$F = 1 - \sqrt{\frac{\Delta P_0}{\Delta P}} \quad \text{Plate Fouling} \quad (I)$$

$$F = 1 - \left(\frac{\Delta P_0}{\Delta P}\right)^{2/5} \quad \text{Cooler Fouling} \quad (II)$$

In general, when F is greater than about 0.3 to about 0.4 (30–40%) a reactor shutdown is inevitable. Preferably, F is less than 40%, preferably less than 30%, even more preferably less than 20%, still more preferably less than 15% and most preferably less than 10% to 0%. The rate of fouling, the change in F as a function of time, is used to quantify fouling. If no fouling occurs the rate of fouling is zero. A minimum acceptable rate of fouling for a commercial operation is about 12 percent/month or 0.4 percent/day, preferably less than 0.3 percent/day, even more preferably less than 0.2 percent/day and most preferably less than 0.1 percent/day.

EXAMPLES

In order to provide a better understanding of the present invention including representative advantages and limitation thereof the following examples are offered.

The properties of the polymer were determined by the following test methods:

Melt Index is measured in accordance with ASTM D-128-Condition E.

Density is measured in accordance with ASTM-D-1238.

Bulk Density is measured as follows; the resin is poured via a ⅞" diameter funnel into a fixed volume cylinder of 400 cc; the bulk density is measured as the weight of resin in the cylinder divided by the 400 cc to give a value in g/cc.

Particle size is determined as follows; the particle size is measured by determining the weight of the material collected on a series of U.S. Standard sieves and determining the weight average particle size.

Fines are defined as the percentage of the total distribution passing through 120 mesh standard sieve.

COMPARATIVE EXAMPLE 1

Operation using a metallocene catalyst based on bis(1,3-methyl-n-butyl cyclopentadienyl) zirconium dichloride is described in this example. It shows the fouling effect of operating a commercial reactor using TEAL. This example includes information from a startup of a commercial reactor on metallocene catalyst.

Catalyst Preparation

The metallocene catalyst was prepared from silica dehydrated at 600° C. The catalyst was a commercial scale catalyst prepared in a mixing vessel with an agitator. An initial charge of 1156 pounds(462 Kg) toluene was added to the mixer. This was followed by mixing 925 pounds (421 Kg) of 30 percent by weight methyl aluminoxane in toluene. This was followed with 100 pounds(46 Kg)of 20 percent by weight bis(1,3-methyl-n-butyl cyclopentadienyl) zirconium dichloride in toluene (20.4 pounds (9.3 Kg) of contained metallocene). An additional 144 pounds (66 Kg) of toluene was added to the mixer to rinse the metallocene feed cylinder and allowed to mix for 30 minutes at ambient conditions. This was followed by 54.3 pounds (25 Kg) of an AS-990 in toluene, surface modifier solution, containing 5.3 pounds (2.4 Kg) of contained AS-990. An additional 100 pounds (46 Kg) of toluene rinsed the surface modifier container and was added to the mixer. The resulting slurry was vacuum dried at 3.2 psia (70.6 kPa) at 175° F. (79° C.) to a free flowing powder. The final catalyst weight was 1093 pounds (497 Kg). The catalyst had a final zirconium loading of 0.40% and an aluminum loading of 12.0%.

Polymerization

The polymerization was conducted in a commercial scale continuous gas phase fluidized bed reactor. The fluidized bed is made up of polymer granules. The gaseous feed streams of ethylene hydrogen are introduced below the reactor bed into the recycle gas line. Hexene comonomer is introduced below the reactor bed in a separate line to the recycle gas line. An inert hydrocarbon such as isopentane is also introduced to the reactor in the recycle gas line. The isopentane is added to provide additional heat capacity to the reactor recycle gases. The individual flow rates of ethylene, hydrogen and comonomer were controlled to maintain fixed composition targets. The ethylene concentration was controlled to maintain a constant hydrogen to ethylene ratio. The concentration of the gases were measured by an on-line gas chromatograph to ensure relatively constant composition in the recycle gas stream. Tri-ethyl aluminum (TEAL) as 20 percent by weight solution in isopentane carrier solvent was introduced above the fluidized bed distributor plate directly into the fluidized bed.

The solid catalyst was injected directly into the fluidized bed using purified nitrogen. The catalyst rate was adjusted to maintain a constant production rate. The reacting bed of growing polymer particles is maintained in a fluidized state by a continuous flow of the make up feed and recycle gas through the reaction zone. The reactor was operated at a total pressure of 310 psig (2138 kPa). To maintain a constant reactor temperature, the temperature of the recycle gas in continuously adjusted up or down to accommodate any changes in the rate of heat generation due to the polymerization.

The fluidized bed was maintained at a constant height by withdrawing a portion of the bed at a rate equal to the formation of the particulate product. The product is removed semi-continuously via a series of valves into a fixed volume vessels. These fixed volume vessels are vented back to the reactor through a recycle gas compressor which recovers reactor gases. The product is transferred to a purger vessel to remove entrained hydrocarbons and treated with humidified nitrogen to deactivate the residual catalyst.

Experimental Results

The experimental run conditions that demonstrated fouling in a commercial gas phase reactor are described below. This experiment was run as the reactor started up from no reaction. TEAL was fed continuously to the reactor for this experiment. The run lasted 18 hours before the run was terminated due to reactor distributor plate and cooler fouling.

TABLE 1

| RUN CONDITIONS | |
| --- | --- |
| Temperature (°C.) | 75.5 |
| Pressure (bar) | 21.4 |
| Ethylene (mole %) | 34.5 |
| Hydrogen (mole ppm) | 60 |
| Hexene (mole %) | 0.72 |
| TEAL Concentration (ppm) | 75 |
| Bed Weight (Kg) | 61250 |
| Production Rate (Kg/Hr) | 10000 |
| Catalyst Productivity (Kg/Kg) | 3300 |
| Resin Bulk Density (g/cc) | 0.42 |
| Average Particle Size (microns) | 835 |
| Fines (% less than 120 microns) | 0.2 |
| Cooler Fouling Rate (%/day) | 16 |
| Plate Fouling Rate (%/day) | 16 |

COMPARATIVE EXAMPLE 2

Operation of a pilot plant reactor using a metallocene catalyst based on bis(1,3-methyl-n-butyl cyclopentadienyl) zirconium dichloride is described in this example. It shows the effect on fouling of operation at two different temperatures using the same catalyst described above.

Catalyst Preparation

The metallocene catalyst was identical to that of Example 1.

Polymerization

The polymerization was conducted in a continuous gas phase fluidized bed reactor. The fluidized bed is made up of polymer granules. The gaseous feed streams of ethylene and hydrogen together with liquid comonomer were mixed together in tee arrangement and introduced below the reactor bed into the recycle gas line. Hexene was used as comonomer. Tri-ethyl aluminum (TEAL) was mixed with this stream as a 1% by weight solution in isopentane carrier solvent. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid catalyst was injected directly into the fluidized bed using purified nitrogen as a carrier. Its rate was adjusted to maintain a constant production rate. The reacting bed of growing polymer particles is maintained in a fluidized state by the continuous flow of the make up feed and recycle gas through the reaction zone. A superficial gas velocity of 1-3 ft/sec was used to achieve this. The reactor was operated at a total pressure of 300 psig. To maintain a constant reactor temperature, the temperature of the recycle gas is continuously adjusted up or down to accommodate any changes in the rate of heat generation due to the polymerization.

The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

Results

The reactor was at steady state producing a 1 melt index and 0.917 density ethylene/hexene copolymer. Run conditions were as follows:

TABLE 2

| Run Conditions | | |
| --- | --- | --- |
| Temperature (°C.) | 71 | 91 |
| Pressure (bar) | 21.7 | 21.7 |
| Ethylene (mole %) | 35.0 | 35.0 |
| Hydrogen (mole ppm) | 53 | 55 |
| Hexene | 0.70 | 0.86 |
| TEAL Concentration (ppm) | 98 | 107 |
| Bed Weight (Kg) | 227 | 225 |
| Production Rate (Kg/Hr) | 54 | 54 |
| Catalyst Productivity (Kg/Kg) | 1900 | 2640 |
| Bulk Density (g/cc) | 0.42 | 0.41 |
| Average Particle Size (microns) | 701 | 771 |
| Fines (% less than 120 microns) | 0.96 | 0.77 |
| Cooler Fouling Rate (%/day) | 1.51 | 2.60 |
| Plate Fouling Rate (%/day) | 0.65 | 1.18 |

These results show high rates of fouling on both the cooler and plate, well beyond the minimum acceptable rate of 0.4%/day. The rate of fouling is higher at higher temperature.

COMPARATIVE EXAMPLE 3

Operation of a pilot plant reactor using a metallocene catalyst based on bis(1,3-methyl-n-butyl cyclopentadienyl) zirconium dichloride is described in this example. It shows the effect on fouling of operation at two different temperatures using the same catalyst described above. It is operated at higher ethylene partial pressure as compared to Example 2.

Catalyst Preparation

The metallocene catalyst was identical to that of Example 1.

Polymerization

The polymerization was conducted in a continuous gas phase fluidized bed reactor as described in Example 2.

Results

The reactor was at steady state producing a 1 melt index and 0.917 density ethylene/hexene copolymer. Run conditions were as follows:

TABLE 3

| Run Conditions | | |
| --- | --- | --- |
| Temperature (°C.) | 72 | 88 |
| Pressure (bar) | 21.7 | 21.7 |
| Ethylene (mole %) | 60.0 | 59.0 |
| Hydrogen (mole ppm) | 85 | 84 |
| Hexene | 1.27 | 1.41 |
| TEAL Concentration (ppm) | 92 | 92 |
| Bed Weight (Kg) | 227 | 226 |
| Production Rate (Kg/Hr) | 53 | 57 |
| Catalyst Productivity (Kg/Kg) | 3730 | 5920 |
| Bulk Density (g/cc) | 0.44 | 0.42 |
| Average Particle Size (microns) | 842 | 990 |
| Fines (% less than 120 microns) | 0.85 | 0.85 |
| Cooler Fouling Rate (%/day) | 1.63 | 2.65 |
| Plate Fouling Rate (%/day) | 1.12 | 1.91 |

These results show high rates of fouling on both the cooler and plate, well beyond the minimum acceptable rate of 0.4%/day. The rate of fouling is higher at higher temperature. Cooler fouling rate is not affected by the ethylene partial pressure, however the plate fouling rate is higher at the higher ethylene concentration, when compared to Example 2.

EXAMPLE 4 OF THE INVENTION

Operation of a pilot plant reactor using a metallocene catalyst based on bis(1,3-methyl-n-butyl cyclopentadienyl) zirconium dichloride is described in this example. It shows the effect on fouling of operation at lower TEAL concentration.

Catalyst Preparation

The metallocene catalyst was identical to that of Example 1.

Polymerization

The polymerization was conducted in a continuous gas phase fluidized bed reactor as described in Example 2.

Results

The reactor was at steady state producing a 1 melt index and 0.917 density ethylene/hexene copolymer. Run conditions were as follows:

TABLE 4

| Run Conditions | |
| --- | --- |
| Temperature (°C.) | 79 |
| Pressure (bar) | 21.7 |
| Ethylene (mole %) | 60.0 |
| Hydrogen (mole ppm) | 85 |
| Hexene | 1.28 |
| TEAL Concentration (ppm) | 29 |
| Bed Weight (Kg) | 227 |
| Production Rate (Kg/Hr) | 51 |

TABLE 4-continued

| Run Conditions | |
| --- | --- |
| Catalyst Productivity (Kg/Kg) | 5360 |
| Bulk Density (g/cc) | 0.44 |
| Average Particle Size (microns) | 960 |
| Fines (% less than 120 microns) | 0.57 |
| Cooler Fouling Rate (%/day) | 1.24 |
| Plate Fouling Rate (%/day) | 1.35 |

These results show reduced rates of fouling on both the cooler and plate as compared to Example 3. However, it was still well beyond the minimum acceptable rate of 0.4%/day.

EXAMPLE 5 OF THE INVENTION

Operation of a pilot plant reactor using a metallocene catalyst based on bis(1,3-methyl-n-butyl cyclopentadienyl) zirconium dichloride is described in this example. It shows the effect on fouling of operation at zero TEAL concentration.

Catalyst Preparation

The metallocene catalyst was identical to that of Example 1.

Polymerization

The polymerization was conducted in a continuous gas phase fluidized bed reactor as described in Example 2.

Results

The reactor was at steady state producing a 1 melt index and 0.917 density hexene copolymer. Run conditions were as follows:

TABLE 5

| Run Conditions | |
| --- | --- |
| Temperature (°C.) | 79 |
| Pressure (bar) | 21.7 |
| Ethylene (mole %) | 60.0 |
| Hydrogen (mole ppm) | 84 |
| Hexene | 1.23 |
| TEAL Concentration (ppm) | 0 |
| Bed Weight (Kg) | 226 |
| Production Rate (Kg/Hr) | 50 |
| Catatyst Productivity (Kg/Kg) | 5310 |
| Bulk Density (g/cc) | 0.45 |
| Average Particle Size (microns) | 966 |
| Fines (% less than 120 microns) | 0.66 |
| Cooler Fouling Rate (%/day) | 0.86 |
| Plate Fouling Rate (%/day) | 0.54 |

These results show the lowest rates of fouling on both the cooler and plate as compared to the previous examples. However, it was still slightly above the minimum acceptable rate of 0.4%/day. This was due to the fact that Examples 2–5 were all conducted during the same polymerization run. The results with no aluminum alkyl were obtained at the very end of the run on a badly fouled reactor. Given this rather severe constraint, this result shows that the rate of fouling was still significantly reduced.

EXAMPLE 6 OF THE INVENTION

Operation of a pilot plant reactor using a metallocene catalyst based on bis(1,3-methyl-n-butyl cyclopentadienyl) zirconium dichloride is described in this example. It shows the effect on fouling of operation at zero TEAL concentration. The reactor was started up with TEAL which was quickly removed after a few hours of operation. Reactor conditions were chosen to match those which had the highest rate of fouling (See Example 3).

Catalyst Preparation

The metallocene catalyst was identical to that of Example 1.

Polymerization

The polymerization was conducted in a continuous gas phase fluidized bed reactor as described in Example 2.

Results

The reactor was at steady state producing a 1 melt index and 0.917 density hexene copolymer. Run conditions were as follows:

TABLE 6

| Run Conditions | |
|---|---|
| Temperature (°C.) | 85 |
| Pressure (bar) | 21.7 |
| Ethylene (mole %) | 60.0 |
| Hydrogen (mole ppm) | 102 |
| Hexene | 1.26 |
| TEAL Concentration (ppm) | 0 |
| Bed Weight (Kg) | 113 |
| Production Rate (Kg/Hr) | 28 |
| Catalyst Productivity (Kg/Kg) | 4580 |
| Bulk Density (g/cc) | 0.39 |
| Average Particle Size (microns) | 946 |
| Fines (% less than 120 microns) | 0.15 |
| Cooler Fouling Rate (%/day) | 0.0 |
| Plate Fouling Rate (%/day) | 0.2 |

These results show the lowest rates of fouling on both the cooler and plate of all the examples. The fouling rate was well below the minimum acceptable rate of 0.4%/day. The reactor was opened after this run and inspected. Bare metal surfaces were observed on both the plate and cooler. In contrast, the reactor was found to contain heavy polymer build-up in both the cooler and plate in the previous examples.

EXAMPLE 7 OF THE INVENTION

Operation of a pilot plant reactor using a metallocene catalyst based on bis(1,3-methyl-n-butyl cyclopentadienyl) zirconium dichloride is described in this example. It shows the importance of using an aluminum alkyl during the start-up of the reactor. Tri-methyl aluminum (TMA), a more volatile and reactive aluminum alkyl, was used.

Catalyst Preparation

The metallocene catalyst was identical to that of Example 1.

Polymerization

The polymerization was conducted in a continuous gas phase fluidized bed reactor as described in Example 2.

Results

The reactor was pressure purged to remove all traces of oxygen and moisture for several hours. Reactor conditions were established as specified in the table below. The reactor was pre-treated with 150 ppm by weight of TMA.

TABLE 7

| Run Conditions | |
|---|---|
| Temperature (°C.) | 79 |
| Pressure (bar) | 21.7 |
| Ethylene (mole %) | 50.0 |
| Hydrogen (mole ppm) | 85 |
| Hexene | 1.0 |
| Bed Weight (Kg) | 113 |

No TMA was fed to the reactor. Catalyst was started. It was continuously fed at an increasing rate for five hours. At this point a TMA solution in isopentane was introduced at a rate of 150 cc/hr. Reaction commenced rather vigorously and in an uncontrolled fashion after 60 minutes. The TMA feed was stopped and the reaction began to fall off. TMA was re-introduced and reaction was again initiated in an uncontrolled fashion. This "spiking" of TMA was continued for several hours until the reaction was able to sustain itself without TMA.

EXAMPLE 8 OF THE INVENTION

Operation of a pilot plant reactor using a metallocene catalyst based on bis(1,3-methyl-n-butyl cyclopentadienyl) zirconium dichloride is described in this example. It shows the importance of using an aluminum alkyl during the start-up of the reactor. It also demonstrates the successful termination of the aluminum alkyl feed rate while maintaining the catalyst activity.

Catalyst Preparation

The metallocene catalyst was identical to that of Example 1.

Polymerization

The polymerization was conducted in a continuous gas phase fluidized bed reactor as described in Example 2.

Results

The reactor was pressure purged to remove all traces of oxygen and moisture for several hours. Reactor conditions were established as specified in the table below. The reactor was not pre-treated with scavenger.

TABLE 8

| Run Conditions | |
|---|---|
| Temperature (°C.) | 79 |
| Pressure (bar) | 21.7 |
| Ethylene (mole %) | 50.0 |
| Hydrogen (mole ppm) | 185 |
| Hexene | 1.2 |
| Bed Weight (Kg) | 227 |

TEAL was added as an isopentane solution as the feed gases were introduced to attain the above concentrations together with the catalyst. Reaction was noted immediately upon introduction of catalyst. Feed of the TEAL was continued until 25% of the expected production rate was achieved. The TEAL feed was terminated and the reaction continued to proceed until full production rate was attained. TEAL was fed for only 95 minutes with the catalyst. Full reaction rate was achieved after four hours in the absence of TEAL.

This result shows the importance of a scavenger, herein an aluminum alkyl, to initiate reaction. It also shows the ability to remove the TEAL and sustain the reaction once it is initiated.

EXAMPLE 9

Examples 9A through 9E illustrate the effect of TEAL concentration, in a batch slurry polymerization reactor, on metallocene catalyst activity. All polymerizations were carried out as described below with the appropriate amount of TEAL shown in Table 1 for each example.

Catalyst Preparation

Into a 2 gallon reactor were charged first 1.1 liters of toluene then 0.93 liters of 30 wt % MAO solution in toluene available from Albermarle, followed by 20.1 g of bis(1,3-methyl-n-butyl cyclopentadienyl) zirconium dichloride as a 10% solution in toluene. The mixture was stirred for 30 minutes at room temperature after which 350 g of silica (Davison MS948 dehydrated at 600° C.) was added to the liquid with slow agitation. Stirring speed was increased for approximately 10 minutes to insure dispersion of the silica into the liquid and then 2 portions of 175 g of additional silica were added at slow agitation followed by increased stirring. After all of the silica (700 g) was introduced to the reactor 0.6 liters of toluene was added to make up a slurry of liquid to solid having a consistency of 4 cc/g of silica. Mixing was continued for 15 minutes at 120 rpm after which 5 g of surface modifier AS-990 (available from Witco Chemical Corporation, Houston, Tex.) was dissolved in 100 cc of toluene and was added and stirred for 15 minutes. Drying was then initiated by vacuum and some $N_2$ purge at 175° F. (79.4° C.). When the catalyst appeared to be free flowing it was cooled down and discharged into a nitrogen purged vessel. Approximate yield of 1.0 k of dry catalyst was obtained.

Polymerization

Into a 2 liter autoclave reactor under a nitrogen purge were charged the appropriate amount of triethylaluminum (TEAL), followed by 60 cc of hexene-1 comonomer and 800 cc of isobutane diluent. The content of the reactor was heated to 80° C. after which 100 mg of catalyst was introduced concurrently with ethylene to make up a total reactor pressure of 325 psig (2241 kPag). The reactor temperature was maintained at 85° C. and the polymerization was allowed to proceed for 40 min. After the 40 minutes the reactor was cooled, ethylene was vented off and the polymer dried and weighed to obtain the yield. Table 9 provides the yield and activity data.

TABLE 9

| Example | TEAL Amount (cc) | Mole Ratio of Al to Zr | Yield (g) | Activity (gPE/gCat · h) |
|---|---|---|---|---|
| 9A | 0.3 | 100 | 130 | 1950 |
| 9B | 0.15 | 50 | 154 | 2310 |
| 9C | 0.08 | 25 | 170 | 2550 |
| 9D | 0.04 | 12.5 | 76 | 1140 |
| 9E | 0 | 0 | 0 | 0 |

Since the scavenger is TEAL and the transition metal of the metallocene is zirconium (Zr) the mole ratio for this table is expressed as Al:Zr.

The above example 9 illustrates that a certain level of scavenger in this example TEAL was needed in the polymerization reactor to remove impurities. Above a certain level the scavenger acts as a poison to the catalyst as can be seen by the reduction in activity.

EXAMPLE 10

Operation of a pilot plant reactor using a metallocene catalyst based on bis(1,3-methyl-n-butyl cyclopentadienyl) zirconium dichloride is described in this example. It shows the effect of operating the process of the invention without TEAL on the film quality as reflected by the gel content in the films made in the process of the invention. Gels refer to the inclusion of small, highly visible regions in the film, typically containing a higher molecular weight and/or higher density as compared to the base polymer.

Catalyst Preparation

The metallocene catalyst was identical to that of Example 1.

Polymerization

The polymerizations, Run 1A and 1B, were conducted in a continuous gas phase fluidized bed reactor as described in Example 2.

Results

The reactor was at steady state producing a 1 melt index and 0.917 density ethylene/ hexene copolymer. Run conditions were as follows:

TABLE 10

| Run Condition | RUN 1A | RUN 1B |
|---|---|---|
| Temperature (°C.) | 79 | 79 |
| Pressure (bar) | 21.7 | 21.7 |
| Ethylene (mole %) | 59.0 | 50.0 |
| Hydrogen (mole ppm) | 84 | 215 |
| Hexene | 1.4 | 1.1 |
| TEAL Concentration (ppm) | 92 | 0 |

The films of Run 1B were substantially free of occlusions, whereas the film of Run 1A had a large number of small occlusions, "sandpaper like" in appearance. Typically commercially useful films contain only a minor amount of gels. In this example film was made from polymer produced with the scavenger, TEAL, in the reactor, once the TEAL flow to the reactor was halted, the film appearance improved significantly from a commercially unacceptable film to a film having excellent clarity, particularly for use in stretch films.

The polymers produced by this invention can be used in a wide variety of products and end-use applications. Polymers produced by the process of the invention are useful in such forming operations as film, sheet, and fiber extrusion and co-extrusion as well as blow molding, injection molding and rotary molding. Films include blown or cast films formed by coextrusion or by lamination useful as shrink film, cling filn, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

While the present invention has been described and illustrated by reference to particular embodiments, it will be appreciated by those of ordinary skill in the art that the invention lends itself to variations not necessarily illustrated herein. For example, it is within the scope of this invention to include an apparatus for removing oligomers in the recycle stream, such as that described in U.S. Pat. No. 5,126,414 incorporated herein by reference. Also the process of the invention can be used in a single reactor or in a series reactor or even in series where one reactor is a slurry reactor and the other being a gas phase reactor. It is also contemplated that when using a series reactor system that a traditional Ziegler-Natta catalyst can be used in one reactor in any of the process patents described previously and the process of the invention used in a second reactor. For this reason, then, reference should be made solely to the appended claims for purposes of determining the true scope of the present invention.

We claim:

1. A continuous gas phase process for polymerizing one or more olefin(s), alone or in combination, in the presence of a metallocene catalyst system and in a reactor capable of producing greater than 1,000 lbs/hr of polymer product wherein said process is operated essentially free of scavenger, with less than about 1% of any fines present in the reactor are sized less than 125μ, and the metallocene catalyst system exhibits a productivity greater than 2500 grams of polymer per gram of catalyst.

2. The process of claim 1 wherein the polymer product has a density between 0.88 g/cc to about 0.970 g/cc.

3. The process of claim 1 wherein one of the olefin(s) is ethylene.

4. The process of claim 1 the process is a gas phase fluidized bed process operating in a condensed mode.

5. A continuous gas phase process for polymerizing one or more olefin(s) in a reactor capable of producing greater than 1,000 lbs/hr of polymer product and in the presence of a transition metal metallocene catalyst component, wherein said process operates in the absence of scavenger and the catalyst exhibits a productivity of greater than 2500 grams of polymer per gram of catalyst.

6. A continuous gas phase process for polymerizing monomer(s) in a fluidized bed reactor, said process comprising the steps of:

a) introducing a recycle stream into the reactor, the recycle stream comprising the monomer(s);

b) introducing a metallocene catalyst system into the reactor;

c) introducing less than 300 ppm of scavenger based on the total bed weight;

d) discontinuing the introduction of the scavenger once a catalyst productivity of greater than 2500 grams of polymer per gram of metallocene catalyst is achieved;

e) withdrawing the recycle stream from the reactor;

f) cooling the recycle stream;

g) introducing into said recycle stream additional monomer(s) to replace the monomer(s) polymerized and continuing polymerization in the presence of the metallocene catalyst system in the absence of scavenger;

h) reintroducing the recycle stream into the reactor; and i) withdrawing a polymer product from the reactor at a rate greater than 500 lbs/hr.

7. The process of claim 6 wherein the recycle stream is cooled to form a liquid and a gas phase which is introduced into the reactor.

8. The process of claim 6 wherein the liquid and gas phase are introduced separately into the reactor.

9. The process of claim 6 wherein only the gas phase of the cooled recycle stream is introduced into the reactor.

10. The process of claim 6 wherein the monomer(s) are ethylene and alpha-olefins having from 3 to 20 carbon atoms.

11. The process of claim 6 wherein the liquid phase in the recycle stream is greater than about 2 to about 40 weight percent based on the total weight of the recycle stream.

12. The process of claim 10 wherein the scavenger is introduced into the reactor in an amount less than 250 ppm.

13. The process of claim 10 wherein the scavenger is introduced with the metallocene catalyst system.

14. The process of claim 10 wherein introduction of the scavenger is discontinued within 3 hours from the time the metallocene catalyst system is introduced into the reactor.

15. The process of claim 10 wherein introduction of the scavenger is discontinued once a catalyst productivity of greater than 3000 grams of polymer per gram of the metallocene catalyst system is achieved.

16. The process of claim 6 wherein the process is producing greater than 1000 lbs of the polymer product per hour.

17. The process of claim 6 wherein the process is producing greater than 10,000 lbs of the polymer product per hour.

18. The process of claim 6 wherein the process is producing greater than 50,000 lbs of the polymer product per hour.

19. The process of claim 6 wherein the polymer product has a density between 0.88 g/cc to about 0.970 g/cc.

20. The process of claim 10 wherein the scavenger is condensed out of the recycle stream after the recycle stream is withdrawn from the reactor.

21. The process of claim 10 wherein the scavenger is introduced into the reactor in an amount less than 50 ppm.

22. The process of claim 10 wherein introduction of the scavenger is discontinued within 6 hours from the time the metallocene catalyst system is introduced into the reactor.

23. The process of claim 10 wherein less than about 1% of any fines present in the reactor are sized less than 125μ.

24. In a gas phase process for polymerizing one or more olefins in the presence of a metallocene catalyst system in a reactor wherein a scavenger is introduced into the reactor, the improvement comprising discontinuing the introduction of any scavenger to the reactor during the first twelve hours after the time the metallocene catalyst is introduced into the reactor, and subsequently continuing the polymerization reaction in the presence of a metallocene catalyst in the absence of a scavenger, wherein the catalyst system exhibits a productivity of greater than 2500 grams of polymer per gram of catalyst.

25. The process of claim 2 wherein the reactor is capable of producing greater than 10,000 lbs/hr of polymer product.

26. The process of claim 25 wherein less than about 0.85% of any fines present in the reactor are sized less than 125μ.

27. The process of claim 26 wherein the reactor is capable of producing greater than 50,000 lbs/hr of polymer product.

28. The process of claim 27 wherein less than about 0.15% of any fines present in the reactor are sized less than 120μ.

29. The process of claim 27 wherein less than about 1% of any fines present in the reactor are sized less than 125μ.

30. The process of claim 29 wherein the reactor is capable of producing greater than 10,000 lbs/hr of polymer product.

31. The process of claim 30 wherein less than about 0.85% of any fines present in the reactor are sized less than 125μ.

32. The process of claim 31 wherein the reactor is capable of producing greater than 50,000 lbs/hr of polymer product.

33. The process of claim 32 wherein less than about 0.15% of any fines present in the reactor are sized less than 120μ.

34. The process of claim 5 wherein the scavenger is aluminum alkyl.

35. The process of claim 5 wherein the catalyst exhibits a productivity of greater than 3000 grams of polymer per gram of catalyst.

36. The process of claim 5 wherein the process is producing greater than 10,000 lbs. of the polymer product per hour.

37. The process of claim 5 wherein the process is producing greater than 50,000 lbs. of the polymer product per hour.

38. The process of claim 5 wherein the polymer product has a density between 0.88 g/cc to about 0.970 g/cc.

* * * * *